Figure 1:
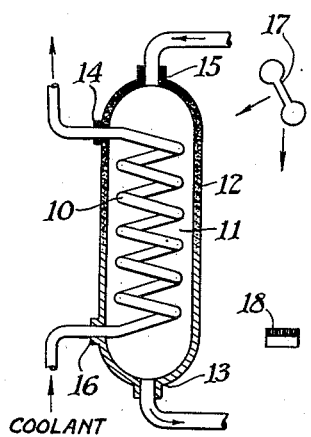

May 8, 1951     F. URBACH     2,551,650
MEASUREMENT OF TEMPERATURE DISTRIBUTION
ON THE SURFACE OF SOLID BODIES

Filed Feb. 11, 1949     2 Sheets-Sheet 1

FRANZ URBACH
INVENTOR

BY
ATTORNEYS

May 8, 1951

F. URBACH 2,551,650

MEASUREMENT OF TEMPERATURE DISTRIBUTION
ON THE SURFACE OF SOLID BODIES

Filed Feb. 11, 1949

2 Sheets-Sheet 2

FRANZ URBACH
INVENTOR

BY Daniel D Mayne
F. M. Emerson Holms
ATTORNEYS

Patented May 8, 1951

2,551,650

UNITED STATES PATENT OFFICE 2,551,650

MEASUREMENT OF TEMPERATURE DISTRIBUTION ON THE SURFACE OF SOLID BODIES

Franz Urbach, Rochester, N. Y., assignor to Eastman Kodak Company, Rochester, N. Y., a corporation of New Jersey Application February 11, 1949, Serial No. 75,823

12 Claims. (Cl. 250—71)

This invention relates to the observation, measurement, and photographic recording of temperatures, and their variation in space and time. In particular, it is concerned with the observation, measurement, and recording of temperature distributions on hot surfaces.

According to the present invention, the brightness and/or color of the luminescent substances brought into temporary or permanent contact with a body of unknown temperature or temperature distribution is compared with the brightness of the same phosphor as observed under comparable circumstances of excitation at known temperatures or with known temperature distributions. A convenient commercial term for this new process is "contact thermography."

Thus, the procedure according to this invention consists of the steps of

1. Observing, measuring or recording the brightness and/or color of the luminescent emission of a phosphor during its excitation by radiation defined as to quality and intensity at different temperatures; or: observing, etc., the brightness distribution on a surface of known temperature distribution coated with the phosphor, 2. Bringing into temporary or permanent contact with the body, the temperature of which, or the temperature distribution on the surface of which, is to be measured, observed, or recorded, the same phosphor as used in step 1 and exciting that phosphor with radiation of an effect comparable with that used in step 1, and 3. Comparing by estimate or measurement the brightness or brightness distribution observed in steps 1 and 2 so as to obtain estimates or measurements of the temperature or temperature distribution prevailing in the 2nd step.

The steps 1 and 2 need not be carried out in the order given above.

In the subsequent paragraphs of this disclosure, I shall refer, with a few exceptions, to observation only. In all cases, however where observation is possible, it is also possible to obtain photographic records or to carry out measurements of the luminescence brightness, for example, by visual photometry or by photoelectric means.

The general principle of this invention is based on the fact that the intensity of emission or visual brightness of various phenomena of luminescence depends strongly on temperature. This temperature dependence is pronounced in various temperature ranges with various phosphors and it depends in a complicated manner on the conditions of operation. Reference is made to the application of the same principle to radiometry as described in my cofiled application Serial No. 75,822 which refers to the use of the temperature sensitivity of phosphors for the observation of images by invisible radiations, in particular, by thermal radiation, sometimes called projection thermography. All details concerning the selection and the operation of the phosphors, described in that application, apply also to the present invention.

One distinguishing feature is quite important in practice however. In the present invention, the phosphor must operate at the temperature of the body whose temperature it is measuring and must be chosen (or the level and/or wave length of excitation must be chosen) to meet this requirement. In the other case, having to do with thermal image recording rather than actual temperature or temperature distribution measurements, the phosphor can be brought to any useful temperature independent of that of the test object.

Another important distinguishing feature is the need for very high sensitivity in the radiography case whereas the present invention can and usually does use phosphors and constructions which are somewhat less sensitive. A temperature coefficient represented by an efficiency change of one per cent per degree centigrade is adequate for many purposes. Selection of a phosphor in terms of the ratio of its efficiency (at the temperature in question) to its optimum efficiency is similarly less strict and adequate results are obtained when the efficiency is less than one half the optimum (as compared to the requirement, specified in the cofiled application, that it be less than one third).

In one form of the present invention the contact between phosphor and object is a permanent one. For example, a coating consisting of a suitable fluorescent or phosphorescent material is applied by conventional means such as spraying or brush painting to the surface of the object, the temperature behavior of which is to be observed. In this case of permanent contact, it is definitely preferable to carry out the observation during excitation. The radiation of a source, for instance, an ultraviolet emitting lamp or group of lamps arranged in a suitable lay-out, is directed on to the phosphor-coated surface and the fluorescence of the phosphor surface is observed during the excitation. When a permanent record is desired, a photograph of the luminosity of the surface is taken. When quantitative measurement is desired, the emission coming from different points of the object is projected by means of a low power microscope or simple lens onto a phototube and the photocurrent produced is noted or recorded. Direct photometer methods (e. g. with a Macbeth illuminometer) work but are not so convenient. By suitable motion of either the photoelectric receiver or the lens, or both, the surface of the object is scanned when a quantitative record of the temperature distribution over the whole surface is desired.

In the case of temporary contact a variety of procedures may be used, but the preferable system has the phosphor coated on a resilient support. The recording of temperatures on the surface of a product delivered in a continuous stream from any manufacturing equipment (e. g. rock wool which emerges in the form of a broad band or layer from the production machinery) is accomplished by using a phosphor in the form of an endless and sufficiently long band or belt pressed against the surface of the rock wool material and kept in contact with it for a short time. Preferably fluorescence is used, and preferably the phosphor is excited and observed at or shortly after the time of contact. This is one case where thermoluminescence can be used however and the phosphor may be excited before or during the contact with the warm body and observed respectively during or after this contact. However, the phosphorescent case requires the phosphor to be on a constantly moving band and the excitation to be at fixed distance ahead of the observation point to insure constancy of excitation at the time of observation. Fluorescence is still preferable however.

One interesting embodiment of the invention, using either temporary or permanent contact between the phosphor and the surface of the object being tested has the luminescent material distributed on the surface in small thin patches. Preferably phosphorent tape is used which is temporarily affixed in selected significant places on the object; that is, the phosphor is strategically located on the object surface. The phosphor brightness under predetermined intensity of excitation is easily observed or measured at a distance from the object. The use of small patches of phosphor is particularly advantageous when large surfaces are being surveyed, especially when complete painting of the surface is impractical. Also there are some cases in which a complete painting of the surface would affect the normal thermal radiation from the surface in such a manner as to influence its temperature materially and thus to interfere with the factor being measured. For example, a thin polished metal sheet has a temperature which is quite susceptible to variation in radiance. The same is true of the temperature of the surface of the human body which changes considerably when covered.

In cases in which it is difficult to maintain uniform exciting intensities over a large surface, there is a very simple expedient which may be used. A temperature-insensitive phosphor is placed next to the temperature-sensitive one and the source or sources of exciting radiation are arranged so that both samples are uniformly or homogeneously illuminated by the exciting radiation. The brightness of both samples is then measured and the nontemperature-sensitive one is taken as a reference standard. Since there is a separate standard next to each test patch, uniform illumination of all the patches is no longer necessary. This expedient is useful both with phosphors whose efficiency is linear and those whose efficiency is non-linear, i. e. dependent on intensity, the source distance being adjusted in the latter case.

Various embodiments of the invention are illustrated in the accompanying drawings:

Fig. 1 illustrates testing, according to the invention, the temperature distribution in the condenser of a distilling system.

Figure 2:
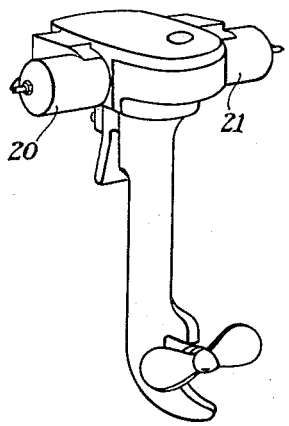

Fig. 2 similarly illustrates testing the temperature distribution of an engine.

Figure 3:
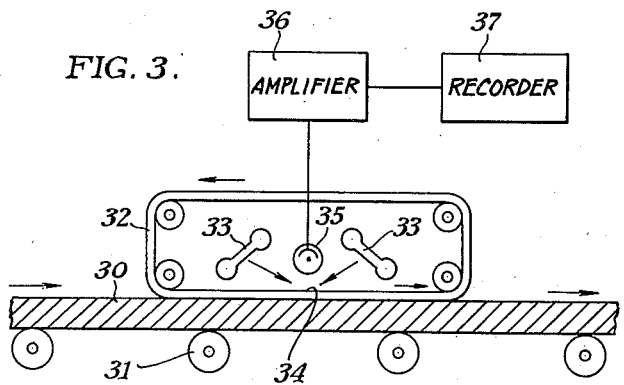

Fig. 3 is a schematic cross section of a preferred embodiment of the invention applied to a continuous process of manufacturing web or sheet material.

Figure 4:
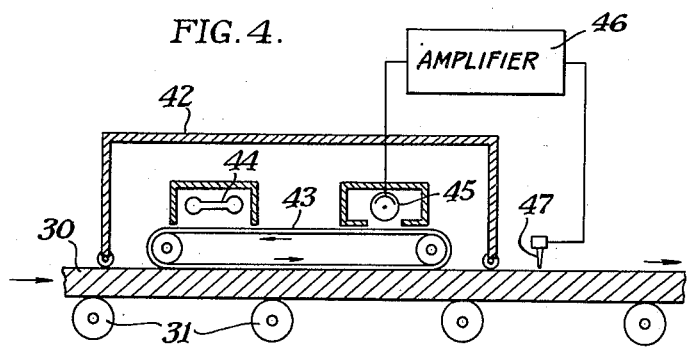

Fig. 4 similarly illustrates an alternative arrangement employing phosphorescence.

Figure 5:
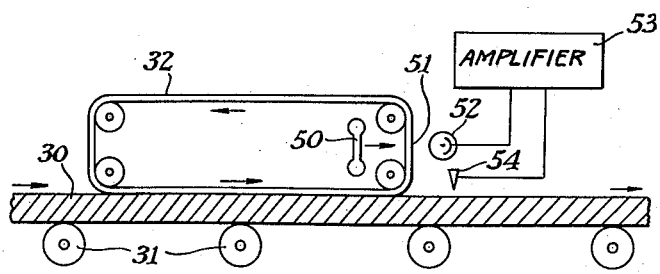

Fig. 5 similarly illustrates a slight modification of Fig. 3.

Figure 6:
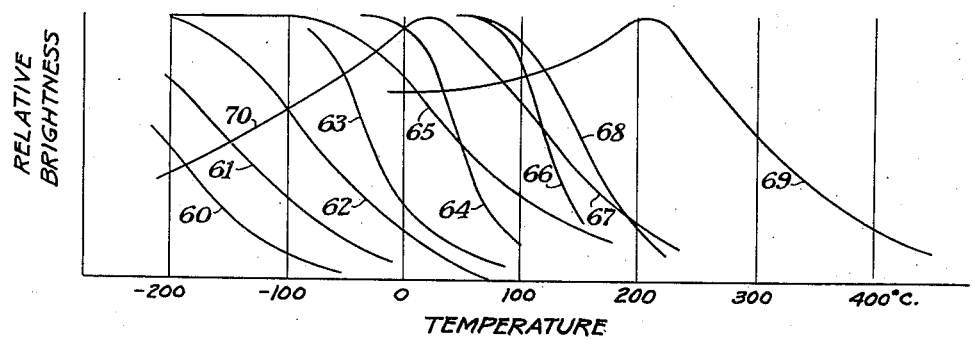
Figure 7:
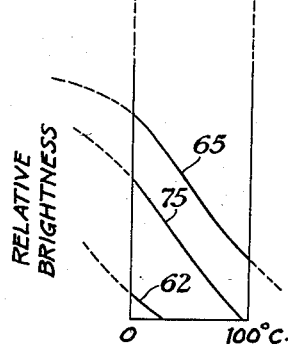
Figure 8:
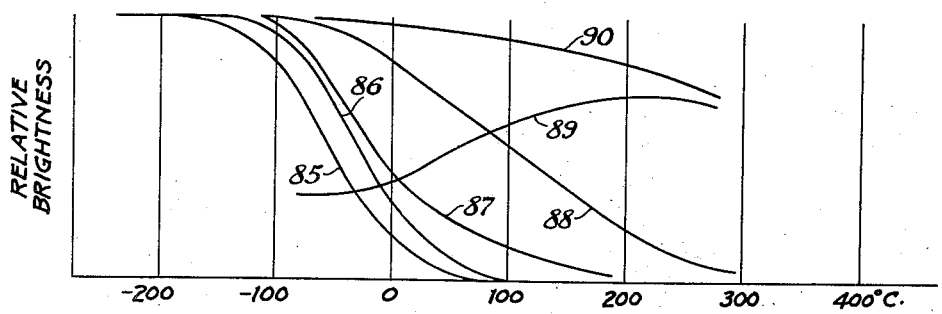

Figs. 6, 7 and 8 show typical curves of fluorescence against temperature under constant excitation, for various phosphors.

In Fig. 1 the cooling coil 10 of a still is encased in a condensing chamber 11 and a suitable coolant is passed through coil 10 as indicated by arrows. According to the invention the surface of the chamber 11 is coated with a fluorescent phosphor 12 which is sensitive to temperature changes in the range of temperatures at which the chamber 11 is during operation. The phosphor 12 is illuminated by ultra-violet light from a source 17. Since the phosphor is one whose efficiency, and hence whose brightness under constant excitation, falls off at higher temperatures, the lower end 16 of the chamber 11 near the entrance of the cooling coil appears quite bright, whereas the part 14 near the exit of the cooling coil 10 and the neck 15 through which the distilling vapor enters into the chamber 11 both appear quite dark. Since the coil 10 is quite long, the material entering the chamber 11 at 15 reaches equilibrium with the coolant and hence the phosphor at the point 13 has a brightness more or less equal to that of the adjacent part 16 of the chamber 11. However, when the distillate flows too fast through the coil 10, or the coil 10 is too short, or the coolant is supplied at too slow a rate, the point 13 becomes darker than the point 16 indicating that the distillate has not reached equilibrium with the coolant. A small disc 18 of the phosphor is maintained at a constant temperature at or somewhat below boiling point of the distillate to act as a monitor. For example, if the point 16 appears darker than the monitor disc 18, some of the distillate is passing in vapor form through the outlet of the condenser. When actual temperature distribution is wanted, the phosphor is calibrated against temperatures either before or after observations. Preferably a photographic record of the brightness is made in this case for accurate tests including a record of the monitor 18, the optical density of the latter record being a reference point in determining temperatures from the photographic negative.

Fig. 2, by way of example of an engine, illustrates an outboard motor having two cylinders 20 and 21 whose surface temperatures are to be measured with a view to the installation of cooling fins. The surfaces of the cylinders 20 and 21 are coated with a fluorescent phosphor and uniformly excited according to the present invention. In this case it is highly desirable to calibrate the phosphor so that actual temperatures are measured. The selection of the size and the location of the cooling fins is not illustrated since the present invention is not concerned with this particular step, but rather with the obtaining of information on which to base this selection of fin size and location.

In Fig. 3 a sheet of rock wool 30 passes on rollers 31 under a control unit or recorder. A band 32 of a fluorescent phosphor moves continuously in contact with the rock wool 30 until it has been brought, at least effectively, to the temperature and temperature distribution of the rock wool. It is then illuminated uniformly by light from ultra-violet lamps 33 and the brightness at the point 34 of the phosphor is measured by a photoelectric cell 35 together with a suitable amplifier 36 and recorder 37. The response of the cell 35 can be confined to a small area of the phosphor by suitable masks or optical system, but for many purposes of mass production it is quite satisfactory to allow the cell to receive the fluorescent light from a fairly large area, especially since only the variations in temperature are of prime importance.

In Fig. 4 a somewhat similar arrangement is illustrated. However, since continuous production requires a continuous moving band of phosphor anyway, it is possible in this embodiment of the invention to employ phosphorescence rather than fluorescence. One arrangement for doing this is illustrated in Fig. 4. The housing 42 is provided to confine the light to the test unit and to keep the unit more or less independent of changes in ambient temperatures or illumination. The phosphorescent phosphor 43 in this case passes first under an exciting, ultra-violet lamp 44 and then into contact with the moving band 30. After it has left contact with the rock wool 30, it passes under a photoelectric cell 45. The output of the photoelectric cell 45 through a suitable amplifier 46 controls the valve of an inking system 47. A bad spot in a sheet of rock wool, i. e. a spot which will be inferior in insulating properties, comes off the manufacturing machine at a slightly higher temperature (in spite of its poor heat insulation), and hence causes the area of the phosphor adjacent to it to glow either brighter or less bright depending on whether the phosphor has a positive or a negative temperature coefficient in the range of temperatures being tested. The inking device 47 is at the same distance from the point of separation of the phosphor 43 and the rock wool 30 as is the photoelectric cell 45. Therefore the point of the rock wool 30 under the device 47 corresponds to the point of the phosphor 43 under the photoelectric cell 45. The inking device 47 shoots a blob of ink onto the rock wool whenever the photoelectric cell 45 indicates that a flaw has occurred. The flaws are easily recognized later when the sheet of rock wool 30 is inspected.

A similar result may be obtained with fluorescence as shown in Fig. 5 which corresponds very closely to Fig. 3. In Fig. 5, however, the fluorescence is not tested until after the phosphor 32 has separated from the rock wool 30. That is, the phosphor 32 stays in contact with the moving rock wool 30 until it has reached, or approximated, thermal equilibrium therewith so that its brightness indicates the temperature and temperature distribution of the rock wool. After the phosphor leaves contact with the rock wool 30, but before it has a chance to change temperature appreciably, it is excited by an ultra-violet lamp 50 and the brightness at the point 51 is measured by a photoelectric cell 52, which, again through a suitable amplifier 53 controls an inking device 54. In every case the photoelectric cell circuits can be arranged to respond to cold spots rather than hot spots if desired. Fig. 6 shows phosphors for covering various temperature ranges. In this figure relative brightness, or fluorescent efficiency, of the phosphor is plotted against temperature.

Curve 60 represents a phosphor for use between $-200°$ C. and $-100°$ C. Specifically, it is the curve for a $Sr_2WO_5$ phosphor but $SrMoO_5$, or $PbMoO_4$, or $Li_2W_2O_7$ may be used in this range.

Similarly, curve 61 represents $ZnMoO_4$ but $Sr_3WO_6$ or $Ba_2WO_5$ may alternatively be used between $-100°$ C. and $0°$ C.

Curve 62 is for ZnSCdS(Ag,Ni) under relatively low activation intensities. Cadmium molybdate, lead molybdate mixtures ($CdMoO_4$, $PbMoO_4$) may be substituted in this $-50°$ to $+50°$ C. range. Higher intensity activation moves this curve 62 to the right and at high levels of activation of zinc cadmium sulfides, the curve 65 results. Temperature ranges between these two values can be easily obtained by adjusting the excitation level, for example, by adjusting the distance of the ultra violet source from the phosphor.

Curve 63 is for $Na_2W_2O_7$ (useful $0°$ to $100°$ C.) and curve 64 is for $ZnWO_4$ (useful $50°$ to $125°$ C.). Curve 67 is for $CO_2B_2O_5(Mn)$ under either ultra violet or beta ray activation. It will be noted that at temperature between $-200°$ and $0°$ C. as represented by the part 70 of the curve 67, this phosphor has a positive temperature coefficient. For some phosphors the curves for UV and beta ray excitation are quite different but this particular phosphor has them more or less alike.

Curve 66 is for $CdWO_4$ and curve 68 is for $MgWO_4$ and curve 69 is for ZnS(Ag,Cu) to illustrate phosphors suitable for high temperature ranges.

The dependence of the zinc-cadmium-sulfide phosphors on intensity of activation is illustrated in Fig. 7 which repeats the parts of curves 62 and 65 which fall between $0°$ and $100°$ C. The intermediate curve 75 is the same phosphor with the intensity of excitation about 16 times that for the curve 62. These curves are merely typical ones and would differ for different samples especially if absolute rather than relative brightnesses are measured. Curve 65 is a typical one obtained when a General Electric AH4 ultra violet lamp with a standard Corning 5860 filter is held about six inches or so from the phosphor. Curve 75 corresponds to an intensity of about $\frac{1}{16}$ of that for curve 65 and is obtained by holding the lamp about two feet from the phosphor. Curve 62 is for $\frac{1}{256}$ the curve 65 intensity and has the lamp at eight feet from the phosphor. At any one temperature the lamp setting is not too critical, e. g. around $75°$ C. either curve 65 or curve 75 can be used. The curves illustrate what a wide range of settings are available due to this variation with intensity.

Figure 7A:
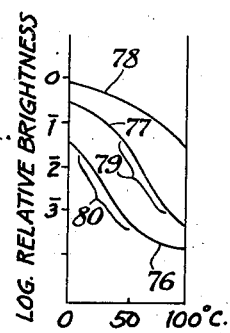

Fig. 7A shows similar curves in which the logarithm of relative brightness is plotted against temperature. That is, the curves 76, 77 and 78 correspond to the curves 62, 75 and 65, respectively, of Fig. 7. The contrast is greatest when the slope of the logarithmic curve is greatest. Thus, the phosphor represented by curve 76 is most useful between $0°$ and $50°$ C. indicated by the section 80 and the phosphor represented by curve 77 is most useful between $50°$ and $90°$ as represented by the section 79 of the curve. It will be noted that these most useful areas correspond to the lower ends of the curves shown in Fig. 7.

Fig. 8 represents the advantage of different types of excitation on temperature response. Curves 85 and 86 are for exactly the same phosphor, namely a 50:50 mixture of cadmium molybdate and lead molybdate but the curve 85 is obtained when the exciting radiation is the 2537 Å line of mercury and the curve 86 results from excitation with the 3650 Å line of mercury. Similarly, curves 87 and 88 are respectively for 2537 Å and 3650 Å excitation of mixtures of cadmium molybdate and lead molybdate in which there is at least 90% cadmium molybdate.

The curves 89 and 90 represent the efficiency of calcium tungstate activated with manganese, that is, $CaWO_4(Mn)$. Thus a positive temperature coefficient is obtained between 0° and 200° C. when this phosphor is excited by the 2537 Å line, but practically no variation when the 3650 Å line is used.

When actual temperatures are to be measured, the phosphor under the conditions in which the measurements have been or are to be made, is calibrated against temperature as represented by the above curves or the equivalent or simultaneous calibration is achieved, for example, by the inclusion of a monitor such as the phosphor button 18 of Fig. 1 maintained at a constant temperature or of a series of monitors maintained at different known temperatures. As pointed out above, it has been found that phosphors are most strongly non-linear at the temperatures at which they have the greatest temperature response. This is a useful way of selecting a phosphor for any particular purpose. That is, one merely selects a phosphor which at the temperature it is to be used, has been found to have a non-linear response. Some phosphors do not have this non-linear response (and still may be useful for temperature measurements), but all phosphors which do have it at any particular temperature are useful for temperature measurements. The shift from curve 62 to 65 is a measure of non-linearity whereas the slope of any one curve is the temperature coefficient employed in the present invention. It should be noted that the non-linearity of the zinc sulfide phosphors is perhaps an extreme case as represented by the range between curves 65 and 66 of Figs. 6 and 7, but it is possible with just one phosphor to make temperature measurements anywhere in a range of 150 or even 250° C. merely by selecting the proper excitation intensity. The selenides are very similar to the sulfides in their response characteristics and can be substituted for the sulfides. These examples are given merely to illustrate the versatility of the invention which does not reside in any particular phosphor but rather in the novel method of measuring temperatures and temperature distribution.

What I claim and desire to secure by Letters Patent of the United States is:

1. The method of measuring the heat distribution on the surface of a solid body, which comprises calibrating against temperature the fluorescent brightness, at a fixed excitation intensity, of a fluorescent phosphor whose fluorescent efficiency varies at least 1% per degree centigrade over a range of temperatures including those at which the body is when the distribution is to be measured, applying said phosphor to the surface of the body, exciting said phosphor uniformly with said fixed excitation intensity and measuring the fluorescent brightness of the phosphor at various points of the surface.

2. The method according to claim 1 including the additional steps of applying some of said phosphor to a body of known temperature and adjusting the excitation to said fixed intensity in accordance with the brightness of said some of said phosphor.

3. The method according to claim 2 in which the emission of the phosphors on said surface and on the body of known temperature is photographed and said measuring is done by measuring the densities on the photographic record.

4. The method according to claim 1 in which said applying is done in patches strategically located on the surface of the body.

5. The method according to claim 1 in which a temperature insensitive phosphor is also applied to the surface of the body adjacent to the one whose efficiency varies with temperature.

6. The method according to claim 1 in which the emission at said various points of the surface is projected onto a photo tube and said measuring is done by measuring the photo current produced by said photo tube.

7. The method according to claim 1 in which the phosphor layer is painted right onto the surface of the body.

8. The method according to claim 1 in which the phosphor is carried by a resilient support and said applying consists of laying the support in intimate contact with said surface.

9. The method of rendering visible the heat distribution in the surface of a solid body when the temperature thereof is in a certain range which comprises selecting a fluorescent phosphor whose efficiency is approximately optimum over another range of temperatures and which falls to less than one-half of said optimum in said certain range, applying said phosphor to the surface of the body and uniformly illuminating the phosphor with exciting radiation.

10. The method according to claim 9 modified to permit the use of a phosphor in which the temperature range of optimum efficiency depends on excitation intensity which includes the additional step of adjusting the excitation intensity to a value which brings the range of optimum efficiency temperature near and outside said certain range of temperatures.

11. The method of rendering visible the heat distribution in the surface of a solid body when the temperature thereof is in a certain range which comprises selecting a fluorescent phosphor whose brightness varies more than linearly with intensity of excitation at temperatures within said certain range, applying said phosphor to the surface of the body and uniformly illuminating the phosphor with exciting radiation.

12. The method according to claim 11 in which a temperature insensitive phosphor is also applied to the surface of the body adjacent to said non-linear phosphor.

FRANZ URBACH.

REFERENCES CITED

The following references are of record in the file of this patent:

UNITED STATES PATENTS

| Number | Name | Date |
|---|---|---|
| 1,636,970 | Sulzberger | July 26, 1927 |
| 1,648,058 | Parker | Nov. 8, 1927 |
| 2,071,471 | Neubert | Feb. 23, 1937 |
| 2,085,508 | Neubert | June 29, 1937 |
| 2,225,044 | George | Dec. 17, 1940 |